United States Patent
Giglia et al.

(10) Patent No.: US 11,192,070 B2
(45) Date of Patent: *Dec. 7, 2021

(54) ENHANCED STABILITY FILTER INTEGRITY TEST

(71) Applicant: EMD Millipore Corporation, Burlington, MA (US)

(72) Inventors: Salvatore Giglia, Bedford, MA (US); David Nhiem, Lowell, MA (US)

(73) Assignee: EMD Millipore Corporation, Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/862,137

(22) Filed: Apr. 29, 2020

(65) Prior Publication Data
US 2020/0254392 A1 Aug. 13, 2020

Related U.S. Application Data

(63) Continuation of application No. 15/770,893, filed as application No. PCT/US2016/051268 on Sep. 12, 2016, now Pat. No. 10,702,832.

(Continued)

(51) Int. Cl.
*B01D 65/10* (2006.01)
*G01N 15/08* (2006.01)

(52) U.S. Cl.
CPC .......... *B01D 65/102* (2013.01); *B01D 65/10* (2013.01); *B01D 65/104* (2013.01); *G01N 15/08* (2013.01);

(Continued)

(58) Field of Classification Search
CPC .... B01D 65/102; B01D 65/104; B01D 65/10; B01D 2273/18; G01N 15/08; G01N 15/082; G01N 15/0826; G01N 2015/084
See application file for complete search history.

(56) References Cited

U.S. PATENT DOCUMENTS

| 5,480,554 A | 1/1996 | Degen et al. |
| 5,576,480 A | 11/1996 | Hopkins et al. |

(Continued)

FOREIGN PATENT DOCUMENTS

| CA | 2257151 C | 8/2005 |
| CN | 1979124 A | 6/2007 |

(Continued)

OTHER PUBLICATIONS

"International Preliminary Report on Patentability received for PCT Application No. PCT/US2016/051268", dated May 22, 2018, 7 pages.

(Continued)

*Primary Examiner* — Peter J Macchiarolo
*Assistant Examiner* — Anthony W Megna Fuentes
(74) *Attorney, Agent, or Firm* — EMD Millipore Corporation (57) ABSTRACT

A method of integrity testing a porous material is disclosed, providing a porous material suitable for filtration to be tested, said porous material having a first surface and a second surface; wetting said porous material with a wetting liquid; providing a gas stream comprising at least first and second gases humidified with said wetting liquid below the saturation vapor pressure of said wetting liquid and wherein said humidified gas stream has a humidity of 50-99%; introducing said gas stream to said first surface of said porous material; causing said first and second gases to flow through said porous material; measuring the concentration of at least one of said first and second gases in the permeate stream exiting said second surface of said porous material; and comparing the measured concentration to a predetermined concentration.

20 Claims, 4 Drawing Sheets

Related U.S. Application Data (60) Provisional application No. 62/257,830, filed on Nov. 20, 2015.

(52) U.S. Cl.
CPC ....... *G01N 15/082* (2013.01); *G01N 15/0826* (2013.01); *B01D 2273/18* (2013.01); *G01N 2015/084* (2013.01)

(56) References Cited

U.S. PATENT DOCUMENTS

| | | | |
|---|---|---|---|
| 6,119,506 | A | 9/2000 | Gibson et al. |
| 6,214,231 | B1 | 4/2001 | Cote et al. |
| 6,228,271 | B1 | 5/2001 | Cote |
| 6,983,504 | B2 | 1/2006 | Grummert et al. |
| 7,594,425 | B2 | 9/2009 | Lewnard et al. |
| 7,972,515 | B1 | 7/2011 | Mangum et al. |
| 7,982,481 | B2 | 7/2011 | Dehmel et al. |
| 8,571,296 | B2 | 10/2013 | Jons |
| 10,702,832 | B2 * | 7/2020 | Giglia ............... B01D 65/10 |
| 2001/0020416 | A1 | 9/2001 | Yoshikawa et al. |
| 2002/0117232 | A1 | 8/2002 | Gisper-Sauch et al. |
| 2004/0123646 | A1 | 7/2004 | Echigo et al. |
| 2005/0229681 | A1 | 10/2005 | Yamaguchi et al. |
| 2007/0089489 | A1 | 4/2007 | Lewnard et al. |
| 2007/0120275 | A1 | 5/2007 | Liu |
| 2008/0110243 | A1 | 5/2008 | Burke et al. |
| 2009/0320564 | A1 * | 12/2009 | Piombini ........... G01N 15/0826 73/38 |
| 2011/0138936 | A1 | 6/2011 | Collins et al. |
| 2012/0080375 | A1 | 4/2012 | Scheu et al. |
| 2013/0019658 | A1 | 1/2013 | Hao et al. |
| 2013/0158933 | A1 | 6/2013 | Huang et al. |
| 2013/0192346 | A1 | 8/2013 | Steele |
| 2013/0234723 | A1 | 9/2013 | Behrens et al. |
| 2014/0298893 | A1 | 10/2014 | Laubstein et al. |

FOREIGN PATENT DOCUMENTS

| | | |
|---|---|---|
| CN | 101266234 A | 9/2008 |
| CN | 102049199 A | 5/2011 |
| CN | 102313691 A | 1/2012 |
| CN | 102435224 A | 5/2012 |
| CN | 102492663 A | 6/2012 |
| DE | 4215585 A1 | 11/1993 |
| DE | 19726379 A1 | 1/1999 |
| DE | 20009001 U1 | 8/2000 |
| DE | 19918419 A1 | 10/2000 |
| DE | 10116335 C1 | 10/2002 |
| DE | 102011111050 A1 | 2/2013 |
| DE | 102012216772 A1 | 3/2014 |
| EP | 0139202 A1 | 5/1985 |
| EP | 0518250 A1 | 12/1992 |
| EP | 0582822 A1 | 2/1994 |
| EP | 0831318 A1 | 3/1998 |
| EP | 0909210 A1 | 4/1999 |
| EP | 1210298 B1 | 4/2003 |
| EP | 1775015 A1 | 4/2007 |
| EP | 1897605 A1 | 3/2008 |
| EP | 1925356 A1 | 5/2008 |
| EP | 2238461 A1 | 10/2010 |
| EP | 2436653 A1 | 4/2012 |
| EP | 2490794 A1 | 8/2012 |
| EP | 2567750 A1 | 3/2013 |
| EP | 2668489 A2 | 12/2013 |
| FR | 2909904 A1 | 6/2008 |
| JP | 2004-219407 A | 8/2004 |
| JP | 2007-108178 A | 4/2007 |
| JP | 2008-209397 A | 9/2008 |
| JP | 2010-503850 A | 2/2010 |
| JP | 2014-504732 A | 2/2014 |
| KR | 10-2011-0127011 A | 11/2011 |
| NL | 1020491 C2 | 10/2003 |
| NL | 1021197 C1 | 10/2003 |
| WO | 93/19356 A1 | 9/1993 |
| WO | 93/22970 A1 | 11/1993 |
| WO | 97/45193 A1 | 12/1997 |
| WO | 00/50158 A1 | 8/2000 |
| WO | 00/59615 A1 | 10/2000 |
| WO | 01/16030 A1 | 3/2001 |
| WO | 01/45829 A1 | 6/2001 |
| WO | 2009/092694 A1 | 7/2009 |
| WO | 2011/049790 A1 | 4/2011 |
| WO | 2012/103124 A2 | 8/2012 |
| WO | 2017/087057 A1 | 5/2017 |

OTHER PUBLICATIONS

"International Search Report and Written Opinion received for PCT Application No. PCT/US2016/051268", dated Jan. 10, 2017, Jan. 10, 2017, 10 pages.

Belanger et al., "Use of Pressure-hold Test for Sterilizing Filter Membrane Integrity in Radiopharmaceutical Manufacturing", Nuclear Medicine and Biology, vol. 36, No. 8, Nov. 2009, pp. 955-959.

Giglia et al., "High Sensitivity Binary Gas Integrity Test for Membrane Filters", Journal of Membrane Science, vol. 323, No. 1, Oct. 2008, pp. 60-66.

Giglia et al., "New Binary Gas Integrity Test Improves Membrane Quality Assurance", BioPharm International, vol. 24, No. 4, Apr. 1, 2011, 04 pages.

Kent et al., "An Evaluation of Membrane Integrity Monitoring Methods for Micro- and Ultrafiltration Systems", American Waterworks Association, WQTC Conference, 2005, pp. 1-10.

Lieberman A., "Characterization of Particles in Liquid Suspension", Tappi Journal, Filter Evaluation, vol. 71, No. 6, Jul. 1988, pp. 105-113.

Meltzer, "Microfiltration: Diffusive Airflow Integrity Testing Revisited", Ultrapure Water, vol. 6, No. 9, 1989, pp. 11-14.

Meyer Jens, "Filter Testing: Parallel Integrity Testing of Small Venting Filters", Filtration & Separation, vol. 46, No. 3, 2009, pp. 22-24.

* cited by examiner

ENHANCED STABILITY FILTER INTEGRITY TEST

RELATED APPLICATIONS

This application is a continuation of U.S. application Ser. No. 15/770,893, filed on Apr. 25, 2018, which is a US National Stage application of International Application No. PCT/US2016/051268, filed Sep. 12, 2016, which claims priority of U.S.

Provisional Application Ser. No. 62/257,830 filed on Nov. 20, 2015, the disclosure of which is incorporated herein by reference in its entirety.

FIELD OF THE DISCLOSURE

The present disclosure generally relates to a method for integrity testing filters, such as liquid sterilizing grade filters.

BACKGROUND

High purity filtration of aqueous media, such as in the fields of biotechnology, chemistry, electronics, pharmaceuticals, and the food and beverage industries requires the use of sophisticated filter modules that are not only capable of a high degree of separation, but that will tend to prevent contamination of the environment, of the medium to be filtered, and of the resulting filtrate. This is designed to prevent unwanted, often dangerous organisms, such as bacteria or viruses, as well as environmental contaminants, such as dust, dirt, and the like from entering into the process stream and end product. To ensure that the sterility and/or retention capability of the porous material responsible for the filtration is not compromised, integrity testing is a fundamental requirement of critical process filtration applications. For example, FDA guidelines recommend integrity testing of filter modules prior to use and after filtration. Typically this testing is initially performed after steam sterilization to ensure that the filter is not damaged; accordingly, care must be taken to ensure that sterility of the filter, and thus the filtrate, is not compromised. Post-processing, the filter integrity test is performed again in situ to detect whether the filter was compromised during use. This information can be used to alert operators to a potential problem immediately after processing, and to quickly take corrective action. Further, FDA guidelines require that integrity testing documentation be included with batch product records.

There are a variety of methods of integrity testing to detect the presence of oversized pores or defects that can compromise the retention capability of porous materials, including the particle challenge test, the liquid-liquid porometry test, the diffusion test, the bubble point test, the gas-liquid diffusion test and diffusion tests measuring tracer components. Some of these tests, such as the particle challenge test, are destructive and therefore cannot be used as a pre-use test. Gas-liquid diffusion tests often lack sensitivity for detecting small defects, due to the inherent background noise in these tests. Liquid-liquid porometry and bubble point tests are useful for ensuring that a membrane with the proper nominal pore size is installed, but lack sensitivity for identifying small numbers of small defects.

Also known in the art is the binary gas test, where two gases of differing permeabilities are driven through the liquid layer of a wetted filter. This test allows for improved defect detection sensitivity compared to the single gas diffusion test and other integrity tests. A sweep flow of the binary gas pair on the upstream side of the membrane to maintain a constant composition on the upstream (inlet) side of the filter is used. A pressure differential between the upstream and downstream side of the filter is established by elevating the pressure of the inlet gas. The concentration of the gases on the downstream (permeate) side of the filter (enriched in the faster permeating gas) is then measured, and this measured value is compared to a known expected value from an integral filter. A deviation from the expected value is indicative of a defect in the filter being tested.

The binary gas test typically uses $CO_2$ and $C_2F_6$ as the binary gas pair and water as the wetting liquid. The use of $CO_2$ is advantageous in that it is highly permeable in water, resulting in a high flow rate through the wetted filter and a rapid measurement of the permeate concentration. However, $CO_2$ is costly, particularly in a binary gas mixture with the preferred gas pair $C_2F_6$. Furthermore, the use of this binary gas pair is undesirable in view of the greenhouse gas implications, since the permeate and sweep gases are emitted or must be captured to prevent emission to the ambient air.

Other binary gas pairs, such as $O_2$ and $N_2$, also have been used. This pair is convenient in that they are present in air, is low cost and is environmentally friendly. At room temperature, oxygen permeates through water about twice as fast as nitrogen. However, the permeability of oxygen in water is about 30 times slower than carbon dioxide, adding to the time necessary to complete the test in comparison to when $CO_2$ is one of the binary gases.

The low permeate flow rate with air means that an extended time is required to flush the volume downstream of the filter and the volume up to and including the volume in the gas composition analyzer. Flushing is required to ensure that the measured composition is not compromised by mixing with any gas existing in the downstream volume prior to the start of the test. The long test time is in itself problematic but also introduces a secondary problem in that the liquid contained in the filter will tend to dry out due to liquid evaporation from both the upstream and downstream sides of the filter. If the pores dry out, the test can no longer be performed.

In light of the above, a need exists for an integrity test method for filters that allows for the use of relatively slow permeate gas pairs, but does not require excessive test times and minimizes or eliminates the risk that the filter will dry out during the test.

SUMMARY

The problems of the prior art are addressed by the embodiments disclosed herein, which include a method of integrity testing porous materials that is non-destructive to the material being tested. In certain embodiments, the method includes humidifying the inlet gas stream to minimize or prevent the porous material from drying out. In certain embodiments, the inlet gas stream includes at least two gases, wherein one of the gases has a different permeability than the other in the liquid (e.g., water) used to wet the porous material. In certain embodiments, the at least two gases include oxygen and nitrogen. In certain embodiments, the inlet gas stream is air. In certain embodiments, the permeate gas stream is subjected to a driving force such as reduced pressure to increase the flow of gases and reduce test time. In some embodiments, multiple porous materials can be integrity tested at the same time, such as by manifolding a plurality of them together. The integrity test is capable of detecting the presence of oversized pores or defects that can compromise the retention capability of the porous material. In certain embodiments, the porous material is a sterilizing grade filter.

In some embodiments, a system for integrity testing a porous material is provided, the system comprising a gas stream source comprising at least first and second gases humidified with a wetting liquid at or near the saturation vapor pressure of the wetting liquid; a housing comprising a porous material wetted with a wetting liquid, the porous material having a first and second surface, the housing being in fluid communication with the gas stream source; a vacuum pump or the like in communication with the housing; and an analyzer for measuring the concentration of at least one of the first and second gases in a permeate stream exiting the second surface of the porous material.

In certain embodiments, the integrity test is rapid, sensitive, non-destructive, inexpensive, not deleterious to the environment, and easy to carry out. It provides a reliable assessment of the integrity of the porous material or element, while maintaining a highly stable integrity signal, and enabling the use of low permeability but otherwise very convenient and low cost gases in conjunction with a sensitive binary gas test method.

BRIEF DESCRIPTION OF THE DRAWINGS

For a better understanding of the present disclosure, reference is made to the accompanying drawings, which are incorporated herein by reference and in which.

DETAILED DESCRIPTION

Before describing the embodiments in further detail, a number of terms will be defined.

As used herein, the singular forms "a", an, and "the" include, plural referents unless the context clearly dictates otherwise.

The expression "integral" as used herein when referring to porous materials such as a porous single layer or porous membrane, porous multilayers, or a plurality of porous membranes, means a non-defective porous material.

The expression "non-integral" or as used herein when referring to porous materials such as a porous single layer or porous membrane, porous multilayers, and a plurality of porous membranes means a defective porous material. Non-limiting examples of defects in a porous layer or membrane include, but are not limited to, oversized pores, improper bonding (e.g., delamination or separation) between a plurality of porous layers or membranes that are bonded together to form a multilayer element, and defects on the porous layer or porous membrane.

The expression "porous material", as used herein, may include, but is not limited to, one or more porous membranes, sheets, rods, discs, tubes, layers, filters, filter elements, filtration media, containers, cylinders, cassettes, cartridges, columns, chips, beads, plates, monoliths, hollow fibers, and combinations thereof. The porous materials may be pleated, flat, spirally wound, and combinations thereof. It may be a single layered or multilayered membrane device. The membrane may be symmetric or asymmetric. The porous material may be contained in a housing, which may have an inlet and an outlet. It may be used for filtration of unwanted materials including contaminants such as infectious organisms and viruses, as well as environmental toxins and pollutants. The porous material may be comprised of any suitable material, including, but not limited to polyether sulfone, polyamide, e.g., nylon, cellulose, polytetrafluoroethylene, polysulfone, polyester, polyvinylidene fluoride, polypropylene, a fluorocarbon, e.g. poly (tetrafluoroethylene-co-perfluoro(alkyl vinyl ether)), poly carbonate, polyethylene, glass fiber, polycarbonate, ceramic, and metals.

Embodiments disclosed herein include a method for integrity testing porous materials, including porous single layer materials, porous materials having a multi-layered configuration, porous membranes and filters. The porous material may be in a housing providing a feed or inlet side and a permeate or outlet side. In certain embodiments, a plurality of gases, such as a low-cost binary gas pair, such as oxygen and nitrogen, available via compressed air, are used as the inlet gas to perform the test. In certain embodiments, the porous material is wetted (i.e., the pores in the material are filled) with a liquid, such as water, and a first surface of the wetted porous material to be tested is contacted, under pressure, with the humidified gas. In certain embodiments, the identity of the liquid used to humidify the gas is the same as the liquid used to wet the porous material. The concentration of at least one of the gases near a second surface of the porous material (e.g., in a permeate stream of the porous material) is measured. In some embodiments, the measured concentration is compared to a predetermined concentration to determine if the porous material is integral or non-integral. In some embodiments, the predetermined concentration is the concentration expected from an integral porous material or device. In certain embodiments, a vacuum is applied to the permeate stream to accelerate the flushing of the downstream volume of the device containing the porous material. Suitable vacuum levels include any downstream pressure below atmospheric. In certain embodiments, a downstream pressure between about 1 psia and 5 psia is suitable.

Suitable amounts of each gas are not particularly limited. The gases should have different permeation rates through the liquid used to wet the porous material. The ratio of faster permeating gas to slower permeating gas in the gas mixture is influenced by a number of factors, including the ease of composition measurement, gas flow rate through the membrane, and economic considerations. In the case of air, the composition is fixed by ambient conditions. The composition of air on a dry basis is 20.95% $O_2$, 78.09% $N_2$, 0.93% Ar, 0.04% $CO_2$, and trace levels of other gases.

The predetermined concentration may be the concentration of gas calculated to diffuse through an integral (i.e., non-defective), wetted porous material at a given temperature and pressure, or may be an actual concentration of gas that diffused through an integral wetted porous material at a given temperature and pressure.

In certain embodiments, the porous material is wetted with a liquid (a "wetting liquid") by saturating the porous material with the liquid. Suitable liquids include water, isopropyl alcohol and mixtures of isopropyl alcohol and water. Other liquids also could be used but may not be ideal due to cost and/or convenience.

In another embodiment an apparatus or system for assessing the integrity of a porous material is provided, the apparatus comprising first and second gas sources; a gas inlet pressure regulator; a humidifier; a porous material sample; and a gas analyzer. Suitable humidifiers include any device which promotes transfer of a liquid into a gas. Although the term "humidity" refers specifically to the amount of water vapor contained in a gas (usually air), the humidifiers suitable for use herein need not be limited to this; they more generally include any device which promotes the vaporization of a liquid so that it is at its saturated vapor pressure. Suitable analyzers depend on the component or components being measured, and include oxygen analyzers for measuring oxygen concentration, mass spectrometers and Fourier Transform Infrared (FTIR) spectrometers. The apparatus may optionally further comprise a vacuum pump or the like for applying a vacuum to the permeate stream of the porous material sample. Where more than one porous material is manifolded together, the apparatus may include suitable valving for sequentially directing respective permeate streams to the gas analyzer. Alternatively or in addition, more than one gas analyzer can be used.

Suitable temperatures for carrying out the integrity test range from about 4° C. to about 40° C., preferably between about 22-24° C. Suitable feed pressures range from about 15 psia to about 100 psia, preferably about 40-70 psia.

Figure 1:
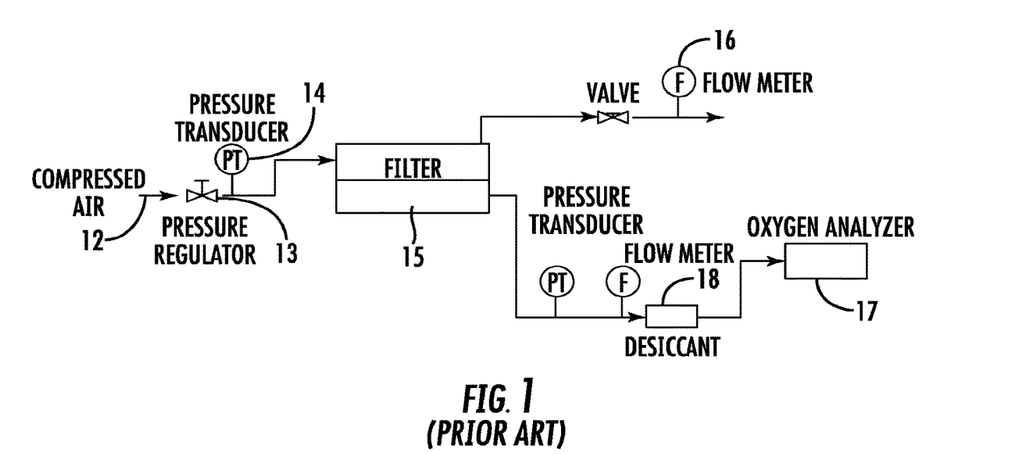
FIG. 1 is a schematic diagram of an integrity test arrangement in accordance with the prior art.

FIG. 1 illustrates a conventional experimental setup to carry out an integrity test that does not include humidification of the inlet gas stream. Thus, compressed air 12 from a suitable source is introduced into the inlet side or upstream side of a filter 15 contained in a housing. A pressure regulator 13 is used to regulate the pressure of the compressed air, and is measured with a pressure transducer 14. A flow meter 16 is in communication with the outlet of the upstream side of the filter as shown. An oxygen analyzer 17 is in fluid communication with the permeate outlet of the filter 15. In certain embodiments, a desiccant 18 may be provided upstream of the oxygen analyzer 17 to remove moisture from the fluid stream prior to the stream entering the oxygen analyzer 17.

Figure 2:
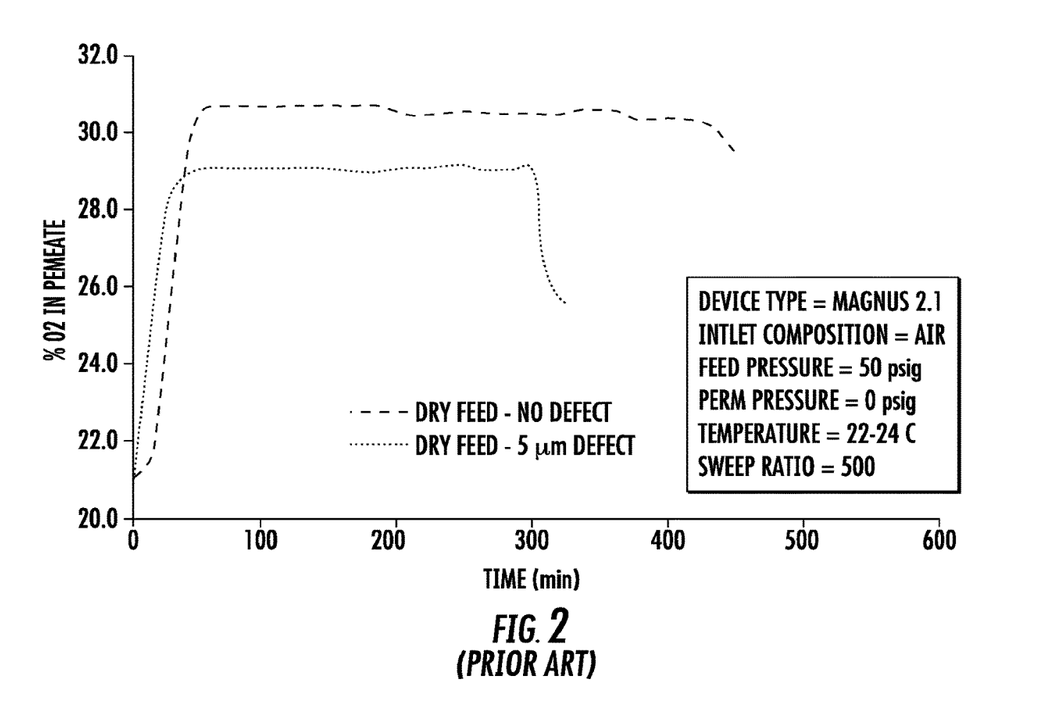
FIG. 2 is a graph of percent oxygen permeation vs. time in accordance with the prior art.

FIG. 2 shows a plot of permeate side oxygen concentration as a function of test time for two water wetted virus membrane filter devices (Magnus 2.1, commercially available from EMD Millipore Corporation), one integral and one containing a controlled 5 µm defect that was created by laser drilling a hole through the membrane layers. Since $O_2$ permeates through water at about twice the rate of $N_2$, the permeate stream will be enriched in $O_2$ compared to the approximately 21% value in atmospheric air. For example, with an air feed at 21% oxygen, the permeate will have an oxygen concentration of about 31% at the conditions listed in FIG. 2. Leakage of oxygen into the 31% oxygen permeate stream will be indicative of a defect.

Air was used as the inlet composition, at a feed pressure of 50 psig and a temperature of 22-24° C. The permeate pressure was 0 psig, and the sweep ratio (the flow rate of retentate (non-permeate) gas to the flow rate of permeate gas) was 500. As seen in FIG. 2, the measured concentration initially rises with time as the pre-existing atmospheric air is flushed out in the volume between the downstream side of the filter 15 and the oxygen analyzer 17. After about 50-60 minutes of testing, the defective device can be differentiated from the integral device. The defective device displays a lower permeate $O_2$ concentration, due to the leak of inlet air (approximately 21% $O_2$) through the defect and into the $O_2$ enriched permeate stream. Continued testing eventually causes the liquid contained in the membrane pores to evaporate, allowing inlet air to leak into the permeate stream. This leak decreases the $O_2$ permeate concentration, an effect that cannot be distinguished from the effect of a leak resulting from a true defect, and could lead to a false positive (integral device identified as defective) test result. The eventual drying of the filter leaves an uncertain time window to assess filter integrity and risks an inaccurate result if the assessment is made too soon or too late. The relatively long test time also is considered to be a drawback, as commonly used integrity tests for virus membrane filters typically can be completed in 30 minutes or less.

Figure 3:
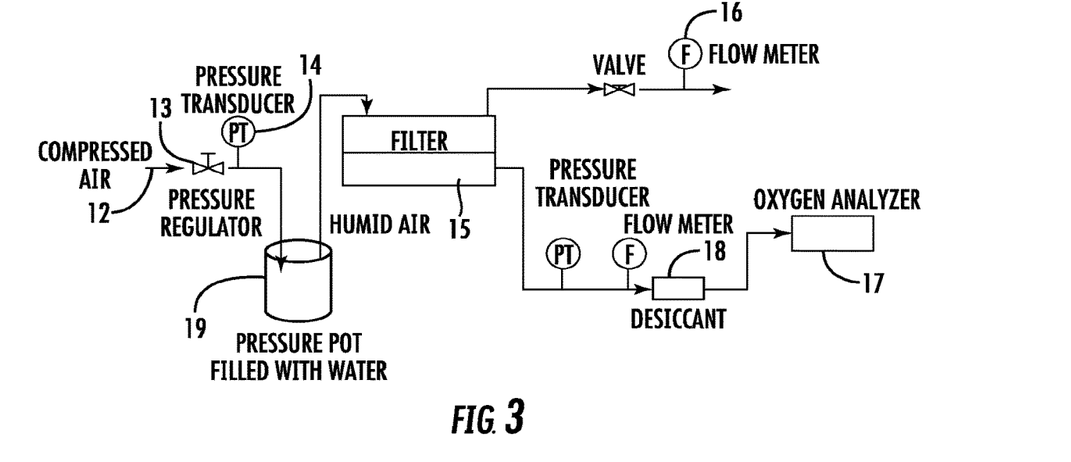
FIG. 3 is a schematic diagram of an integrity test arrangement in accordance with certain embodiments.
Figure 4:
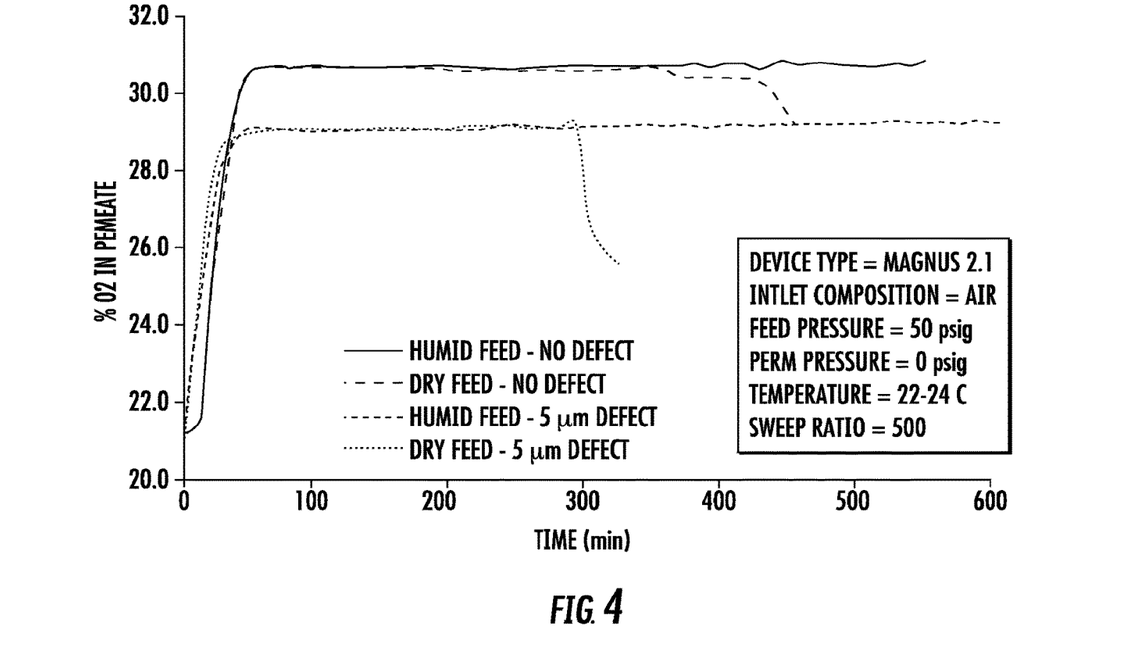
FIG. 4 is a graph of percent oxygen permeation vs. time in accordance with certain embodiments.

FIG. 3 illustrates a testing setup in accordance with certain embodiments. To prevent premature drying of the porous material, the inlet gas is humidified, such as with a suitable humidifier 19. In the embodiment shown, the humidifier is a pressure pot containing water, but those skilled in the art will appreciate that other devices capable of promoting the transfer of a liquid into a gas so that the liquid is at or near its saturated vapor pressure are within the scope of the embodiments disclosed herein. In certain embodiments, the humidity is between about 50 and just below 100% (100% humidity risks condensation). In some embodiments, the humidity is between about 90 and 99%. By humidifying the inlet gas, such as to a near 100% humidity level entering the porous material, the driving force for evaporation of moisture into the sweep stream in the porous material is essentially eliminated. The conditions of the test were the same as in FIG. 3, and the data from FIG. 3 is repeated in FIG. 4 for comparison. As seen in FIG. 4, the humidified inlet air allows for a practically indefinite higher stable integrity test signal. This allows for far more reliable differentiation between integral and non-integral devices.

Figure 5:
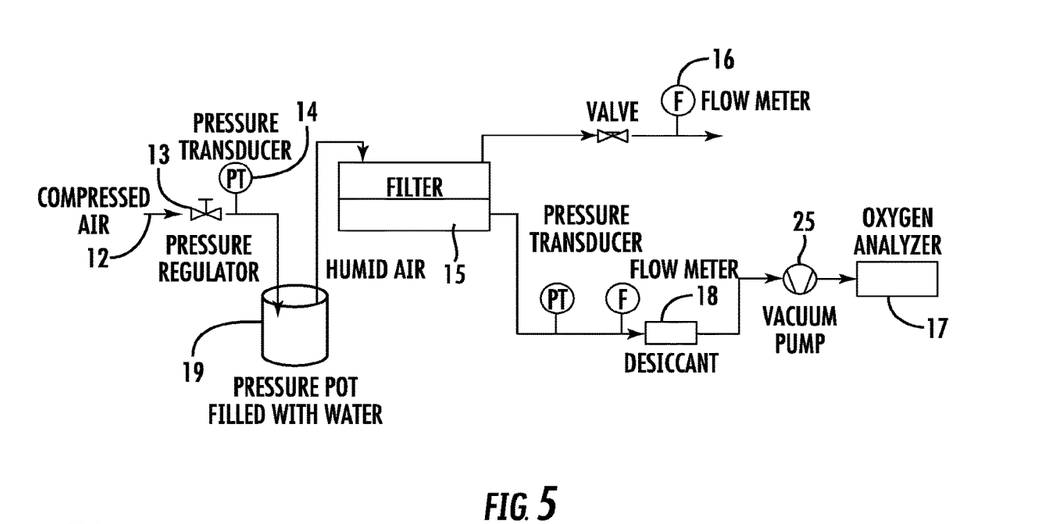
FIG. 5 is a schematic diagram of an integrity test arrangement in accordance with certain embodiments.
Figure 6:
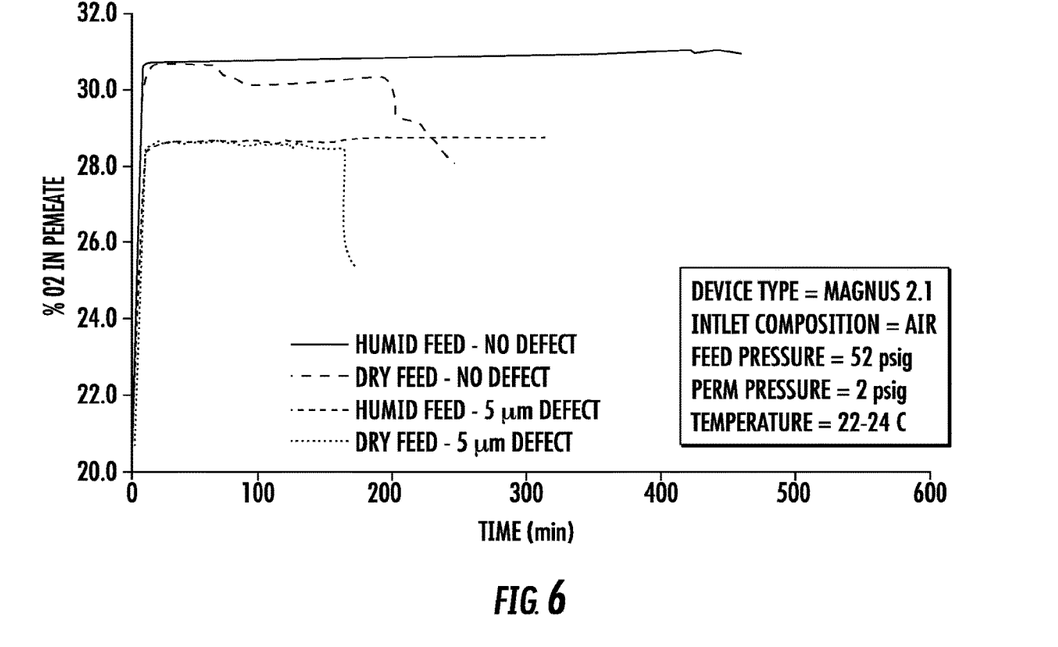
FIG. 6 is a graph of percent oxygen permeation vs. time in accordance with certain embodiments.

In order to accelerate the flushing of the downstream volume, in certain embodiments a driving force such as a vacuum can be applied to the downstream side of the porous material as illustrated in FIG. 5. Accordingly, in certain embodiments, a vacuum pump 25 is placed in fluid communication with the permeate stream, upstream of the oxygen analyzer 17. Suitable pressures in the permeate stream, due to the presence of the vacuum pump 25, are between about 1-15 psia. At lower pressure, velocity increases for the same mass flow rate, thereby reducing flush time which leads directly to a reduced test time. FIG. 6 shows that applying a vacuum to the permeate stream (permeate pressure 2 psia) greatly reduces test time (time at which a defective device can be differentiated from an integral device) compared to the permeate stream at atmospheric pressure. Preferably the test time is as short as possible. A humidified inlet stream maintains a stable signal with the vacuum permeate operation as well. It should be noted that the pressure differential across the porous material was maintained at 50 psi for both the atmospheric and vacuum assist (52 psia feed pressure, 2 psia permeate pressure) conditions, so the diffusive flow rate across the membrane was about the same for both sets of conditions. The higher pressure ratio (ratio of inlet pressure to permeate pressure) at the vacuum assist conditions resulted in a significantly higher permeate $O_2$ concentration. The higher integral permeate stream $O_2$ concentration is an added benefit of the vacuum assist condition since the test can be more sensitive to leaks.

Figure 7:
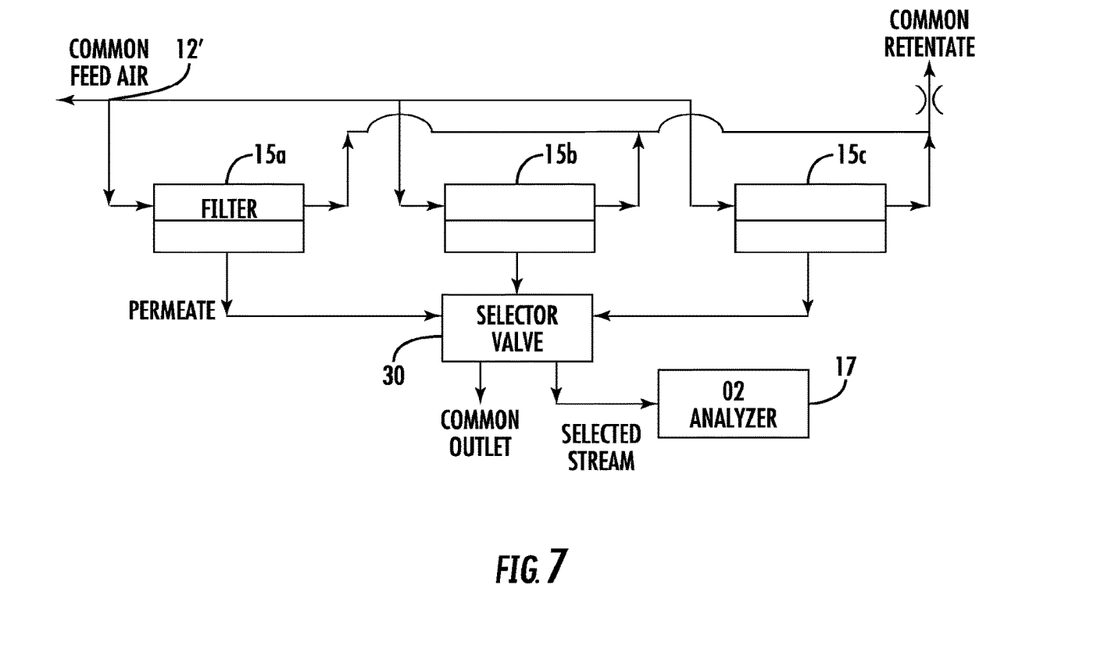
FIG. 7 is a schematic diagram of an integrity test arrangement for multiple filters in accordance with certain embodiments.

In accordance with certain embodiments, multiple filter devices can be manifolded together and the permeate streams can be sampled sequentially, as exemplified in FIG. 7. In the embodiment shown, there are three filters 15a, 15b and 15c, although fewer or more could be manifolded. A common inlet feed 12' may feed the humidified binary gas to each of the filters 15a, 15b, 15c. The permeate streams from each filter 15a, 15b, 15c may be sent to suitable valving 30 which samples the permeate concentrations sequentially, selectively sending each stream to the oxygen analyzer 17. Thus, the downstream volumes of each filter are flushed simultaneously, and after flushing, a sample of each permeate stream may be quickly obtained. If the use of vacuum is desired in this embodiment, separate vacuum pumps can be provided for each filter.

Since multiple filters are equilibrating simultaneously, the average test time for each filter is reduced. For example, if 60 minutes is required for the permeate concentration exiting a device to reach a steady state value, then if five devices are equilibrated simultaneously, and 10 minutes are needed to sample each device, then with a single oxygen analyzer, 110 minutes would be needed to test the five devices, or an average of 22 minutes per device, compared to 70 minutes per device if tested sequentially as single devices. This embodiment relies on maintaining a stable permeate concentration for an extended period of time (no drying of the porous material), which is assured only with a humidified inlet stream.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of integrity testing a porous material, comprising:
    providing a porous material suitable for filtration to be tested, said porous material having a first surface and a second surface;
    wetting said porous material with a wetting liquid;
    providing a gas stream comprising at least first and second gases humidified with said wetting liquid below the saturation vapor pressure of said wetting liquid and wherein said humidified gas stream has a humidity of 50-99%;
    introducing said gas stream to said first surface of said porous material;
    causing said first and second gases to flow through said porous material;
    measuring the concentration of at least one of said first and second gases in a permeate stream exiting said second surface of said porous material; and
    comparing the measured concentration to a predetermined concentration;
    wherein a difference between said measured concentration and said predetermined concentration is indicative of said porous material being non-integral.

2. The method of claim 1, wherein the gas stream is introduced at a feed pressure of about 15 psia to about 100 psia.

3. The method of claim 1, wherein the gas stream is introduced at a feed pressure of about 40 psia to about 70 psia.

4. The method of claim 1, wherein the integrity testing is carried out at a temperature from about 4° C. to about 40° C.

5. The method of claim 1, wherein the integrity testing is carried out at a temperature from about 22° C. to about 24° C.

6. The method of claim 1, wherein said wetting liquid is at the saturation vapor pressure in said gas stream.

7. The method of claim 1, wherein said first gas is oxygen and said second gas is nitrogen.

8. The method of claim 1, wherein said first gas is oxygen, and wherein said concentration of one of said gases is measured with an oxygen analyzer.

9. The method of claim 1, wherein said wetting liquid comprises at least one of water, isopropyl alcohol, or mixtures of water and isopropyl alcohol.

10. The method of claim 1, wherein said porous material is a sterilizing grade filter.

11. The method of claim 1, wherein said porous material comprises a membrane.

12. A method of integrity testing a filter, comprising:
    providing a plurality of porous materials suitable for filtration to be tested, each said porous material having a first surface and a second surface; wetting each said porous material with a wetting liquid; providing a gas stream comprising at least first and second gases humidified with said wetting liquid below the saturation vapor pressure of said wetting liquid and wherein said humidified gas stream has a humidity of 50-99%; introducing said gas stream to each said first surface of each porous material; causing said first and second gases to flow through each said porous material; sequentially or selectively measuring via a single analyzer the concentration of at least one of said first and second gases in a permeate stream of each said porous material; and comparing each measured concentration to a predetermined concentration; wherein a difference between each said measured concentration and said predetermined concentration is indicative of each said porous material being non-integral.

13. The method of claim 12, wherein said humidified gas stream has a humidity of about 90-99%.

14. The method of claim 12, wherein said first gas is oxygen and said second gas is nitrogen.

15. The method of claim 12, wherein the gas stream is introduced at a feed pressure of about 15 psia to about 100 psia.

16. The method of claim 12, wherein the gas stream is introduced at a feed pressure of about 40 psia to about 70 psia.

17. A system for integrity testing a porous material suitable for filtration, comprising:
    a gas stream source comprising at least first and second gases humidified with a wetting liquid below the saturation vapor pressure of said wetting liquid and wherein said humidified gas stream has a humidity of 90-99%;
    a housing comprising a porous material wetted with a wetting liquid, said porous material having a first and second surface, said housing being in fluid communication with said gas stream source; and an analyzer for measuring the concentration of at least one of said first and second gases in a permeate stream exiting said second surface of said porous material.

18. The system of claim 17, wherein said first gas is oxygen and said second gas is nitrogen.

19. The system of claim 17, wherein said analyzer is an oxygen analyzer.

20. The system of claim 17, wherein said wetting liquid comprises at least one of water, isopropyl alcohol, or mixtures of water and isopropyl alcohol.

* * * * *